United States Patent [19]
Wright et al.

[11] Patent Number: 4,899,046
[45] Date of Patent: Feb. 6, 1990

[54] OPTICAL SENSOR OF PHYSICAL MAGNITUDE

[75] Inventors: Oliver Wright, Paris; Sylvain Janssen, Neuilly-sur-Seine, both of France

[73] Assignee: Schlumberger Industries, S.A., Montrouge, France

[21] Appl. No.: 309,958

[22] Filed: Feb. 9, 1989

Related U.S. Application Data

[63] Continuation of Ser. No. 944,121, Dec. 22, 1986, abandoned.

[30] Foreign Application Priority Data

Dec. 24, 1985 [FR] France ................................. 85 19111
Aug. 14, 1986 [FR] France ................................. 86 11767

[51] Int. Cl.⁴ ......................... G01L 1/24; G01L 13/00
[52] U.S. Cl. ................................. 250/227; 250/231 P; 73/705
[58] Field of Search ............... 250/227, 231 R, 231 P; 356/32; 350/96.29; 73/705, 800

[56] References Cited

U.S. PATENT DOCUMENTS 4,342,907  8/1982  Macedo et al. ...................... 73/800
4,463,254  7/1984  Asawa et al. .................... 250/231 R
4,634,858  1/1987  Gerdt et al. ........................ 73/705
4,654,520  3/1987  Griffiths ......................... 250/231 P
4,701,614 10/1987  Jaeger et al. .................... 250/231 P

FOREIGN PATENT DOCUMENTS 3211828 10/1983  Fed. Rep. of Germany ........ 73/705
61-47517-A 7/1986  Japan .

Primary Examiner—Edward P. Westin
Attorney, Agent, or Firm—Dale V. Gaudier

[57] ABSTRACT

An optical sensor for measuring physical magnitudes, such as a differential pressure, is described. The pressure sensor comprises a deformable diaphragm (24) which separates two measurement chambers (26,28) where pressures P1 and P2 exist. An optical conductor (34) is attached to the diaphragm (24). A light source (40) allows a light beam to be radiated towards the conductor (34). An optoelectrical converter (42) performs a detection of the light energy (1) output from the light guide (34), and thus of the difference between both pressures (P1,P2).

19 Claims, 14 Drawing Sheets

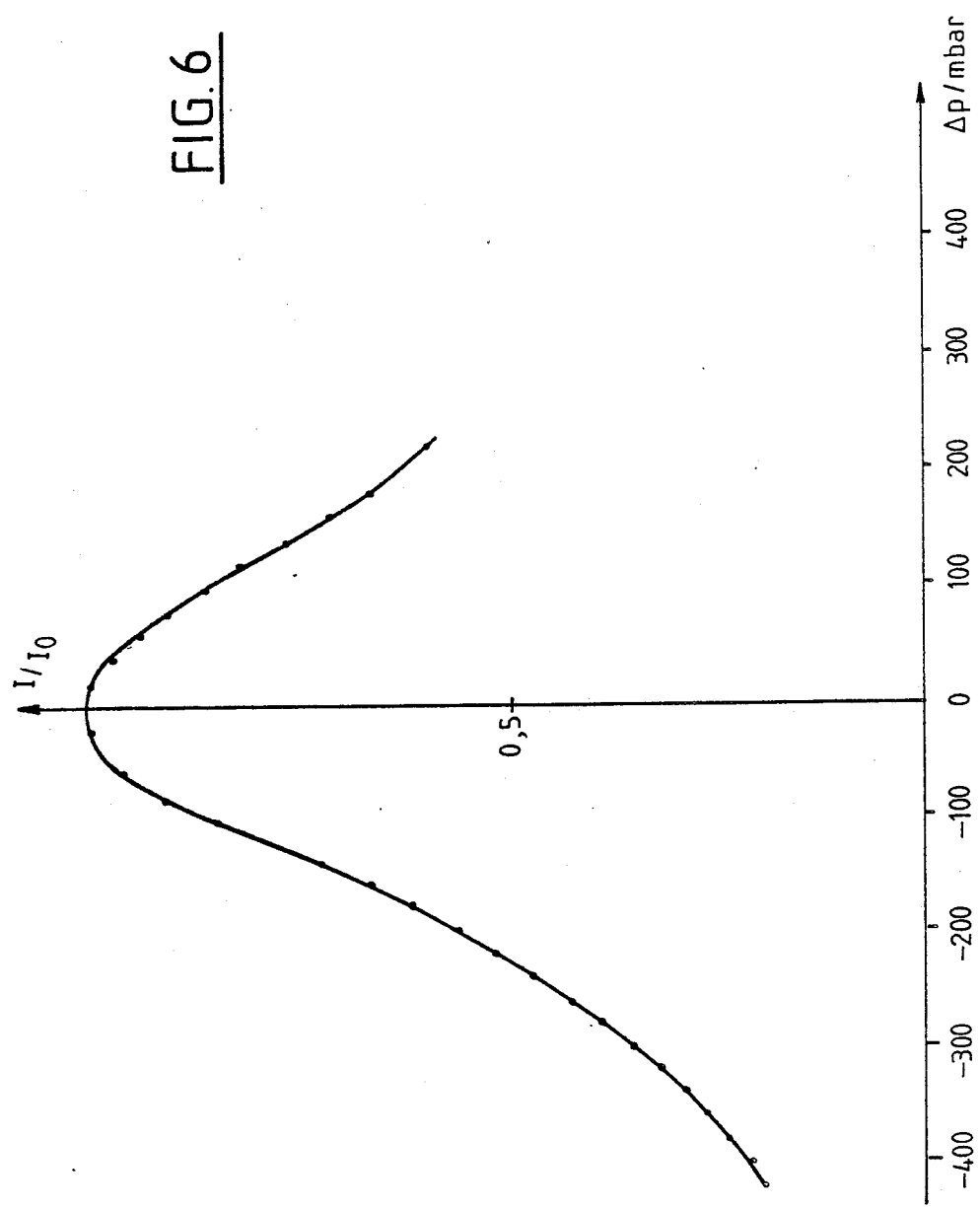

FIG. 13a
FIG. 13b
FIG. 14a
FIG. 14b
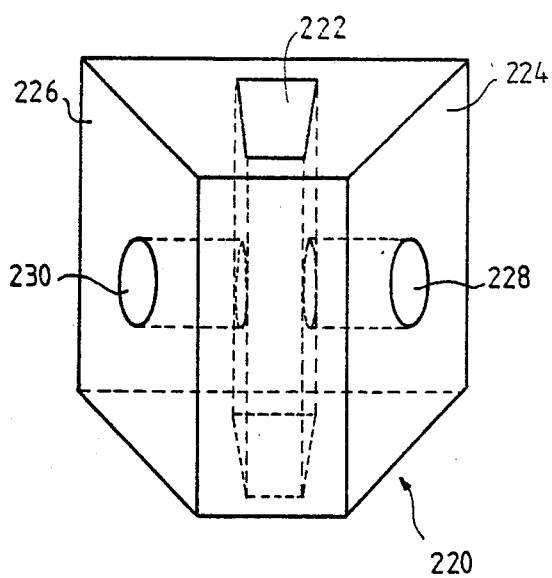
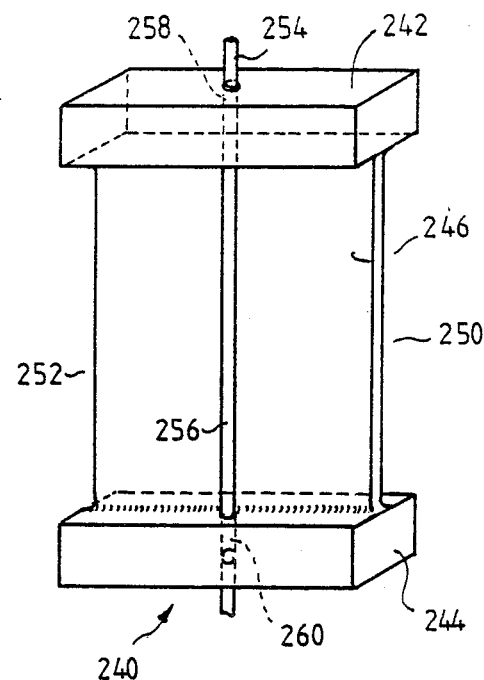
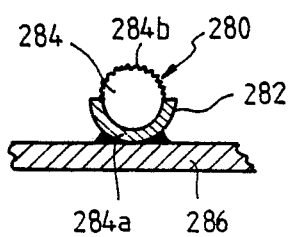
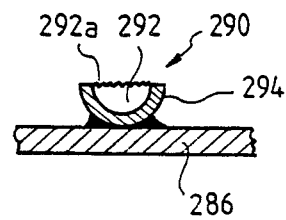

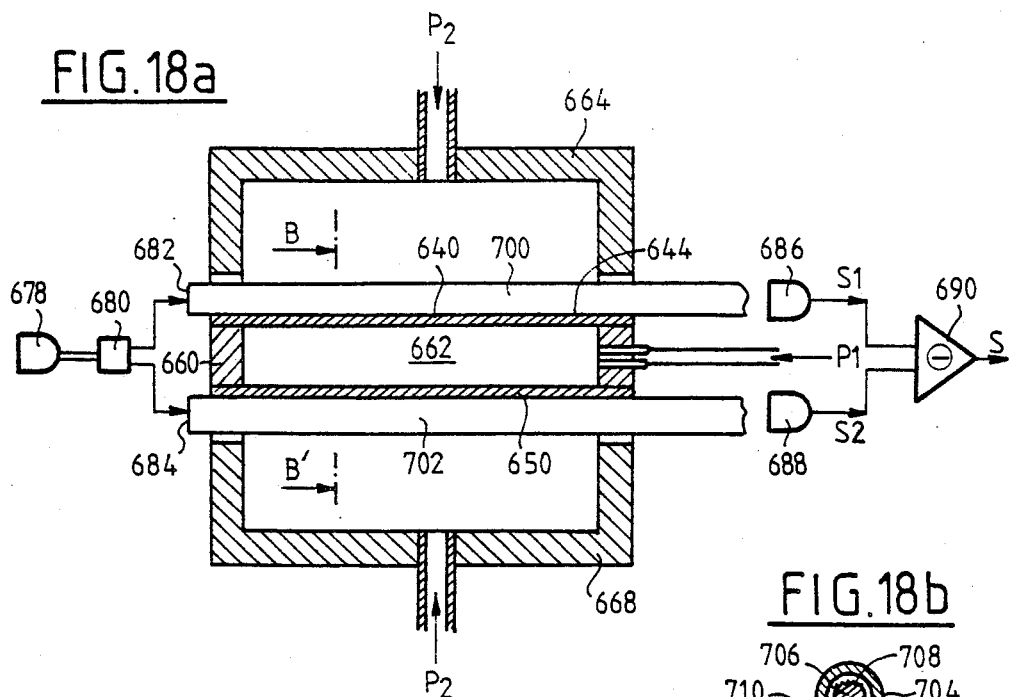
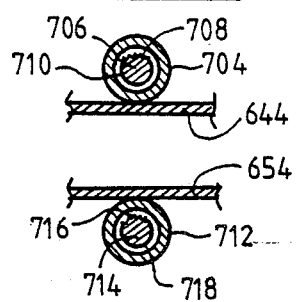
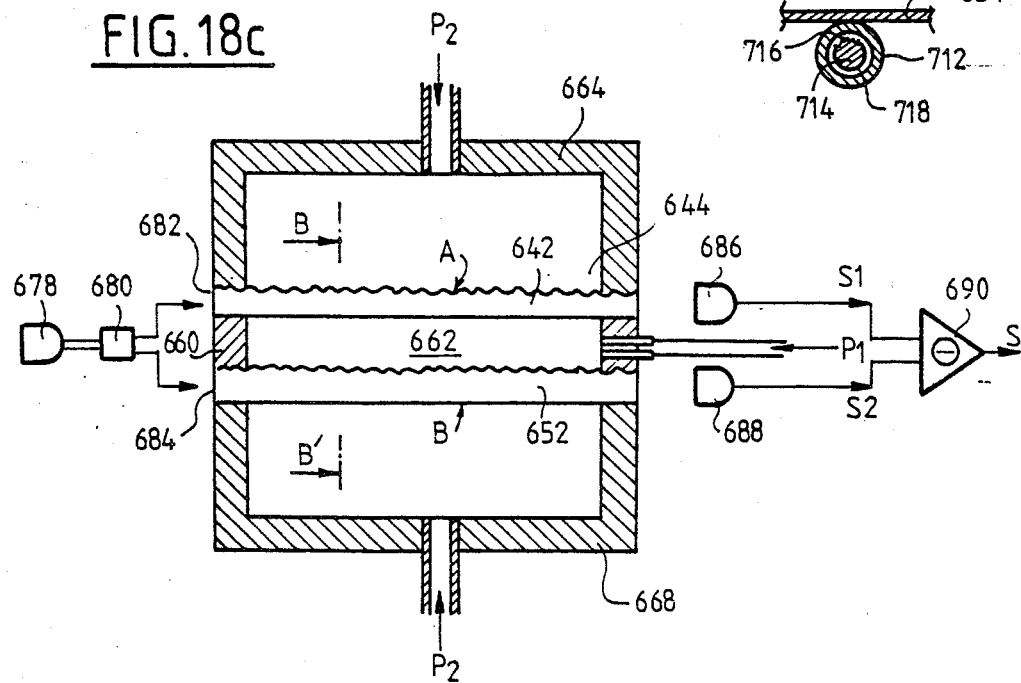

OPTICAL SENSOR OF PHYSICAL MAGNITUDE

This application is a continuation of application Ser. No. 06/944,121, filed Dec. 22, 1986, entitled OPTICAL SENSOR OF PHYSICAL MAGNITUDES, and now abandoned.

BACKGROUND OF THE INVENTION

1. Field of the Invention

This invention relates to an optical sensor for measuring physical magnitudes.

More specifically, the invention deals with a sensor involving optical phenomena for measuring physical magnitudes, essentially though not exclusively a pressure, and in particular, the modulation frequency of a pressure.

2. Description of the Prior Art

There are a number of cases where it is desirable to measure the modulation frequency of a pressure, specifically of a differential pressure without the need for a measurement of the differential pressure value in itself.

This is particularly the case for gas eddy counters.

This type of counter, based on the Karman effect, is well known. A detailed description thereof can be found in French Pat. No. 2,357,868. It will be recalled that such a counter comprises an obstacle provided across the conduit inside which flows the fluid whose flow rate is to be measured. This obstacle generates eddies alternately breaking off from both sides of the obstacle which are positioned substantially parallel to the fluid flow. The generation frequency of such eddies is proportional to the fluid velocity.

To measure this frequency, the changes in the fluid pressure difference in the vicinity of both sides of the obstacle can be measured. In order to do so, the obstacle comprises two conduits which open at both sides of the obstacle. It should be noted that in such a case, the characteristic magnitude is the differential pressure modulation frequency and not the actual differential pressure.

In order to measure the differential pressure modulation frequency, it has already been proposed to use a sensor comprising a membrane on the faces of which are respectively applied both pressures differing by an amount to be measured. The membrane's displacement is measured by a variable inductance detector.

Such a detector, which implies that an electric current must flow, is not satisfactory in the case where the eddy counter is used for measuring the flow rate of a flammable gas, since it then requires the use of an explosion-proof casing.

Moreover, the distance between the place where the counter is installed with its differential pressure sensor and the monitoring facility where it is desired to have a display of the flow rate measurement, is often significant. In the case of the inductive sensor, this information is transmitted as an electric signal which may be disturbed by electromagnetic interference.

The same problem can occur when it is desired to make a remote measurement of a static pressure or of other physical magnitudes such a force and an acceleration, the vibration frequency of a piece, and the like.

To overcome these drawbacks, one object of the invention is to provide a sensor for measuring a physical magnitude, such as, in particular, the modulation frequency of a pressure, which requires no electric or electronic circuitry in the close vicinity of a counter and moreover ensures that the transmission of the measurement signal to a remote location is not liable to be perturbed by electromagnetic interference.

SUMMARY OF THE INVENTION

The object is attained according to the invention by the optical sensor which comprises:
deformable support means;
means for applying to said deformable means a bending deformation which is representative of the value of said physical magnitude, wherein said support means comprises at least one light-guide portion subjected to said deformation and has first and second ends between which said light-guide portion is substantially straight, said light-guide portion comprising a medium able to convey light and bounded by a wall extending between both of said ends, at least one part of said wall having a light absorption and/or light scattering power greater than that of said light-guide medium;
a light source for applying a light beam to one of said ends;
means optically arranged facing said second end for receiving at least one part of the light beam radiated by said light-guide portion; and
means for processing the received signal in order to derive therefrom a characteristic feature of the deformation of the support means.

According to a preferred embodiment, the optical sensor is a differential pressure sensor and the means for applying a bending which is representative of differential pressure, to the support means, comprises means for applying both pressures whose difference is to be measured, to both sides of the support means, said support means thus defining diaphragm means.

In other words, the difference in the pressures applied to each side of the diaphragm causes the bending of such a diaphragm and thus the bending of the light-guide which is made integral therewith.

The bending assumed by the light guide changes the transmission coefficient of the light guide quite substantially, since at least part of the light-guide wall has the above mentioned properties.

According to a first embodiment, the light-guide portion is made of a transparent solid material.

According to a second embodiment, the light-guide portion is made of a hollow conductor.

Thus, if the light guide is filled (made of transparent material), the expression "wall" as used herein then referes to the outer wall of the guide, whereas if the light guide is hollow, the expression "wall" refers to the inner wall of the guide.

Finally, the invention is also aimed at solving the problem resulting from possible deformations of the diaphragm due to spurious external vibrations that might affect the system which incorporates the sensor.

To this end, the optical sensor comprises:
first and second deformable support means, arranged parallel to each other, means for applying to each of the first and second support means a bending deformation which is representative of the value of said physical magnitude, wherein said first and second support means comprise at least one light-guide portion subject to said deformation and having a first and a second ends between which said light-guide portion is substantially straight, said light-guide portion comprising a medium which is able to convey light and being bounded by a wall extending between both of said ends, at least one part of said wall having a light absorption power and/or a light scattering power greater than that of the guide medium;

at least one light source for applying a light beam to the first end of each light guide;

first and second means optically arranged facing each of said second ends, respectively, to collect at least part of the light beam transmitted by the first and second light-guide portions, respectively; and means for processing the collected signals to derive a characteristic feature of the deformation of the support means.

BRIEF DESCRIPTION OF THE DRAWING EMBODIMENTS

Other features and advantages of this invention will appear more clearly from the following description of several embodiments of the present invention, given by way of non-limiting example with reference to the appended drawings, in which:

FIGS. 1a and 1b show a first embodiment of the optical sensor according to the invention, wherein FIG. 1a is a cross-sectional elevation view and FIG. 1b is a top cross-sectional view along line B—B of FIG. 1a;

FIG. 4b is a graph illustrating the operation of the sensor of FIG. 4a;

FIGS. 4c and 4d are schematical views which illustrate the operation of the sensor embodiment of FIG. 4a;

FIG. 6 is a graph illustrating the operation of the sensor of FIG. 5;

FIG. 10b shows a graph illustrating the operation of the sensor of FIG. 10a;

FIGS. 13a and 13b are perspective views of an obstacle for an eddy flow meter, and of an optical pressure sensor adapted to be inserted in said obstacle, respectively;

FIGS. 14a and 14b illustrate modifications of the light guide;

FIGS. 15a and 15b illustrate another embodiment of the invention where the light guide is a hollow tube, wherein FIG. 15a is an elevational cross-section, and FIG. 15b is a cross-sectional view along line II—II of FIG. 15a; FIGS. 14a and FIGS. 16a and 16b illustrate a modification of the hollow tube of rectangular cross-section;

FIGS. 18a and 18b show a modification of the sensor in FIGS. 17a and 17b using a filled light guide for each of both diaphragms;

FIG. 18c is a modification of FIGS. 18a and 18b;

DETAILED DESCRIPTION OF THE PREFERRED EMBODIMENTS

For a best understanding of the invention, several embodiments of the pressure sensors according to the invention will now be described.

Figure 19:
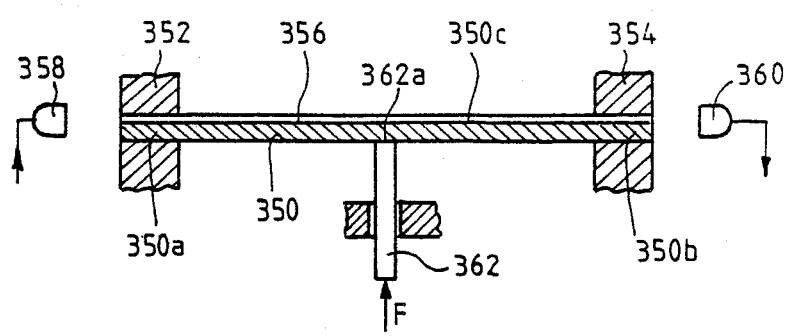
FIG. 19 shows an elevational cross-section of an embodiment of a force sensor according to the invention.
Figure 20:
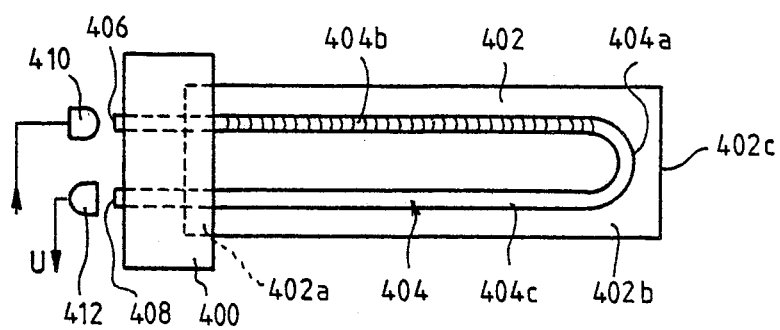
FIG. 20 shows a top view of an accelerometer according to the invention.

FIGS. 1 to 18 relate to a differential pressure sensor, while FIGS. 19 and 20 illustrate a force sensor and an accelerometer, respectively. FIGS. 1 to 14 represent several embodiments of a sensor whose guide is filled, FIGS. 15 and 16 show a sensor whose guide is hollow, and FIGS. 17 and 18 illustrate a dual diaphragm arrangement, with a hollow light guide and a filled light guide, respectively.

In the case of an optical pressure sensor, the support member is a deformable diaphragm and the means for applying a deformation which is representative of the differential pressure to the diaphragm, consists of two separate measurement chambers, each chamber being coupled to the pressure sources between which a difference is to be measured.

Figure 1A:
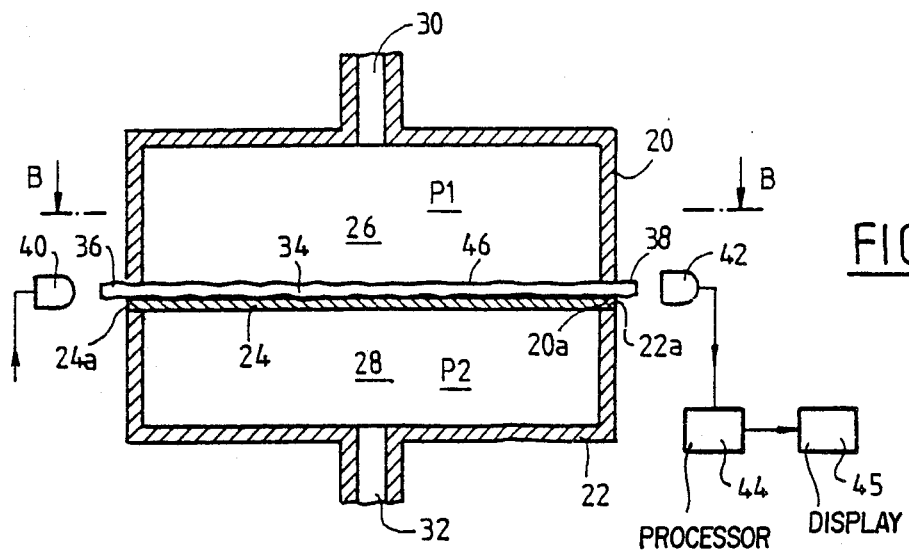
Figure 1B:
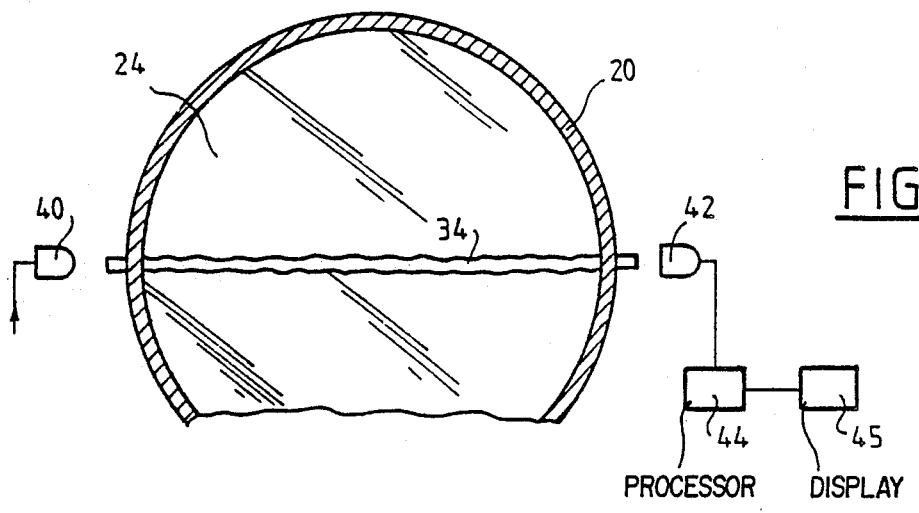

Referring first to FIGS. 1a and 1b, a first embodiment of an optical pressure sensor according to the invention will be described.

The sensor comprises a tight enclosure formed by two half-casings 20 and 22, and a deformable diaphragm 24 the periphery 24a of which is sandwiched between edges 20a and 22a of half-casings 20 and 22. Parts 20 and 22 are coupled to each other, for example, by means of flanges not shown, which provide a tight link between edges 20a and 22a of the half-casings and periphery 24a of diaphragm 24. Half-casings 20 and 22 define with diaphragm 24 two measurement chambers 26 and 28 separated from each other by diaphragm 24. Each half-casing is provided with a conduit 30, respectively 32, for feeding fluids with respective pressures P1 and P2 into measurement chambers 26 and 28. For instance, chambers 26 and 28 are cylindrical and diaphragm 24 is disc-shaped.

The sensor further comprises a light guide 34, which for instance is shaped as a wire attached to one face of the diaphragm 24 along one diameter thereof, so that deformations of diaphragm 24 due to the difference between pressures P1 and P2, are totally transmitted to light guide 34. The ends 36 and 38 of the guide pass through the wall of half-casing 20 in a fluid or gas tight manner.

In the description referring to FIGS. 1 to 14 and 18,1 what is meant by a filled optical or light guide, is an element made of a transparent material. According to the implementation examples, the light guide may be shaped as a wire having a circular or rectangular cross-section, or as a disc.

The expresseion "optical guide" or "light guide" should not be mistaken for the expression "optical fibre" the main function of which is the transmission of a light beam with as low losses as possible, unless it is specifically mentioned that the optical guide consists in an optical fiber.

The filled light guide 34 is for instance glued to diaphragm 24. A light source 40 radiates a light beam towards the end 36 of the light guide, and an optoelectrical converter 42 provided in front of the second end 38 of light guide 34 collects the light signal effectively transmitted thereby and converts it into an electrical signal representative of the received light signal. This signal is processed by circuit 44 which is coupled to the display device 45.

According to the example shown in FIG. 1, the filled light guide has a circular cross-section and a cylindrical side wall 46 which is totally frosted, which means that this wall 46 has a micro-roughness. In this embodiment, diaphragm 34 is plane when the pressure difference is zero. As a consequence, the light guide 34 is straight when the pressure difference is zero. Let Io be the light intensity received by detector 42 when the pressure difference is zero.

When a pressure difference (P1−P2) appears between both sides of diaphragm 24, it bends and assumes a camber y which is representative of the pressure difference. The light guide 34 assumes the same bending and therefore, the same camber y. The light impinging on the frosted wall is scattered outside and inside the light guide. When the bending of the light guide increases as a result of the pressure difference, an increasing fraction of the input light beam undergoes such a scattering phenomenon, as the frosted walls which become deformed, increasingly obstruct the optical path of the light beam. As a result, in that case, as the pressure difference progressively increases, the light energy received by detector 42 decreases.

Phenomena of light scattering on a frosted surface are described in detail in the paper entitled "Light reflection by rough surfaces" by A. S. Toporets in Sov. J. Opt. Technol. 46. (1).1979, p 35.

Figure 2:
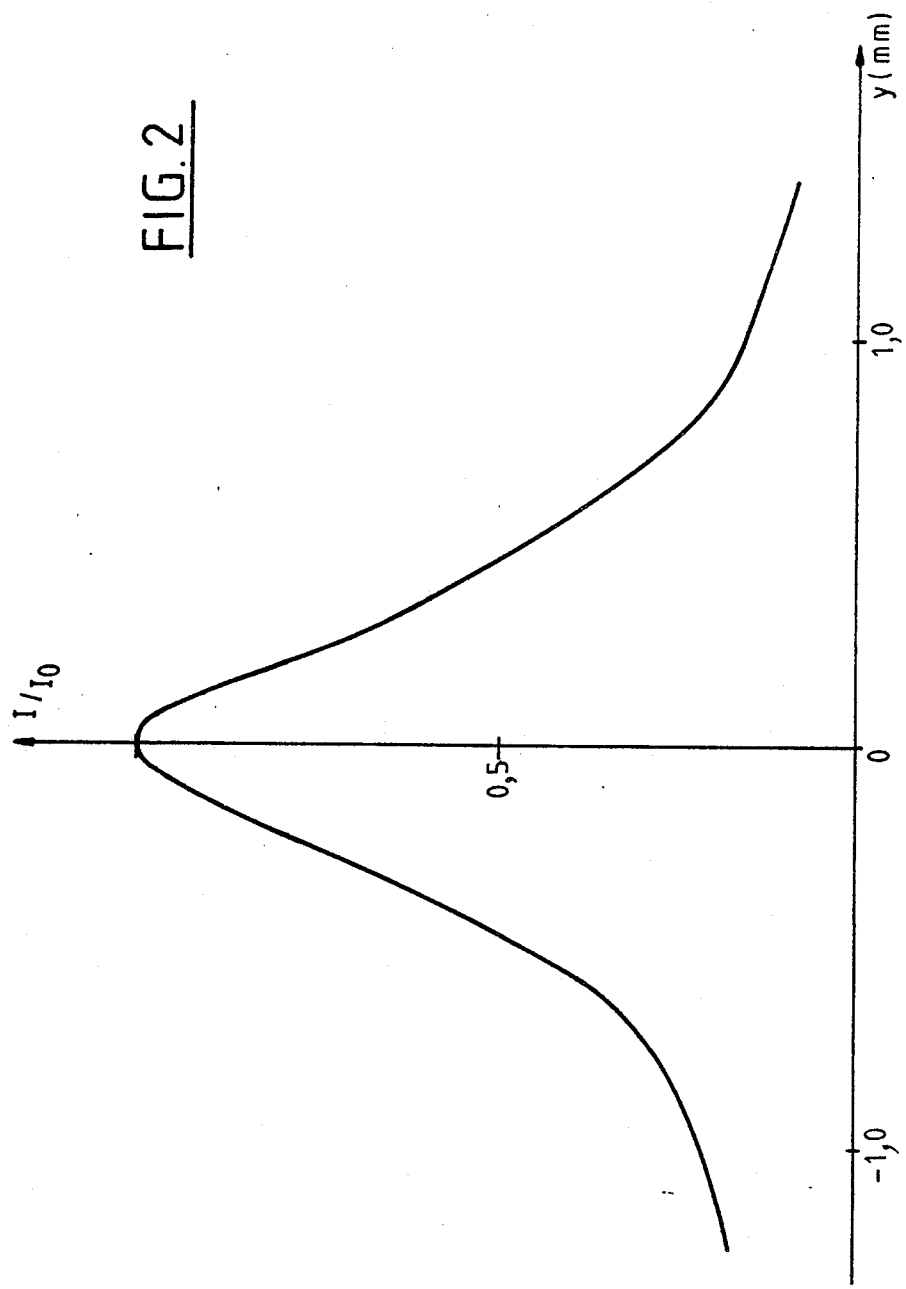
FIG. 2 is a graph showning the operation of the optical sensor according to FIGS. 1a and 1b.

FIG. 2 shows the light "intensity" as received at the output of light guide 34 whose wall is completely frosted. The filled light guide 34 is fiber-shaped, with a deformable (non-fixed) length of 50 mm and a diameter of 1 mm. It is made out of a material available under the trade mark Plexiglass. The light source 40 is of a Lambertian type and radiates a light with a wavelength of 0.88 μm. The ordinates represent the ratio of the received light intensity Io when the guide 34 is straight to the received light intensity I, and the abscissa represent the dsiplacement y of the light-guide's mid point. A symmetrical graph is obtained for positive (P1<P2) and negative (P1>P2) displacements.

It may thus be noted that, by processing the electrical signal delivered by converter 42 in circuit 44, it is possible to measure the differential pressure P1−P2. In particular, if the pressure difference P1−P2 varies with time, it is possible to measure the frequency of differential pressure variations. This is particularly the case when the pressure sensor is coupled to a vortex flow meter, wiith each of measurement chambers 26 and 28 being connected through a conduit to one of both side pressure vents of the obstacle.

If it is wished for safety reasons, to avoid having electronic circuits in the viciinity of the fluid-containing measurement chambers (which is the case for flammable or explosive gases), it is possible to extend the ends 36 and 38 of the light guide 34 with optical fibers. One of such fibers is used to transmit light between source 40 and the end 36 of the light guide, while the other optical fiber is used to transmit, with minimum losses, the light signal collected between the end 38 of the light guide and the optoelectrical converter 42.

As previously mentioned, the ends of light guide 34 must pass through the side wall of chamber 26 in a fluid or gas tight manner. This gives rise to no particular problem as long as the pressure within chamber 26 is not too high. If not so, it is desirable to use one of the arrangements shown in FIGS. 3a and 3b.

Figure 3A:
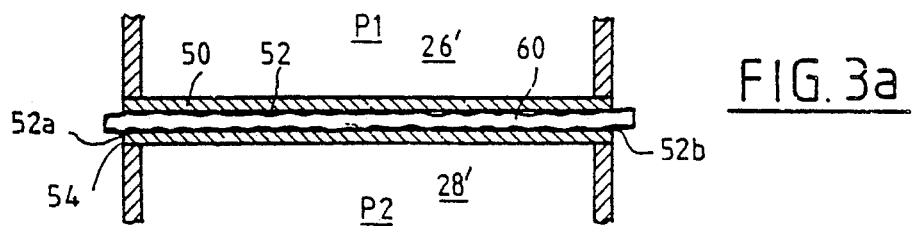
FIG. 3a shows a partial cross-sectional elevation view of a modification of the sensor of FIGS. 1a and 1b.

In the case of FIG. 3a, the deformable diaphragm 50 which separates measurement chambers 26′ and 28′ is provided with a hole 52 arranged along one diameter of diaphragm 50 and having ends that open into the periphery 54 of the diaphragm. A light guide 60 is inserted in hole 52 and is glued therein so that deformations of diaphragm 50 are totally transmitted to the light guide 60. The latter has a frosted side wall just as the light guide 34 of FIG. 1a.

As a consequence, it may be noticed that the problems of tightness are easier to overcome, as it is between the periphery of diaphragm 24 and the camber walls that such a tightness must be ensured.

Figure 3B:
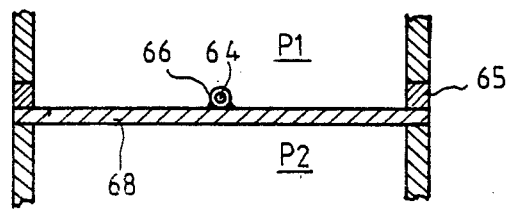
FIGS. 3b and 3c show a partial elevational cross-section, and a partial top view of another modification sensor according to the invention.
Figure 3C:
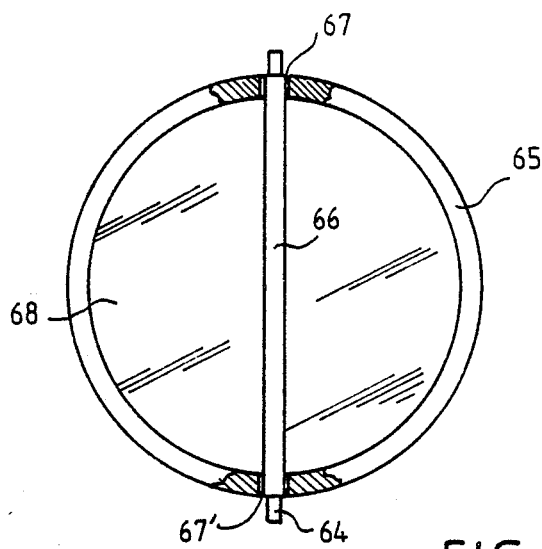

FIGS. 3b and 3c illustrate another modification of the light-guide mounting on the diaphragm.

A filled light guide 64 is inserted into a metal tube 66 arranged along one diameter of a deformable diaphragm 68. Tube 66, which is intended to mechanically protect light guide 64, is welded to one face of diaphragm 68 and the inner space of tube 66 which is not occupied by light guide 64 is filled with glue so that the deformations of diaphragm 68 due to differential pressure are integrally transmitted to the light guide. Diaphragm 68 is surmounted by a ring 65 projecting from the rest of the diaphragm.

Ring 65 is provided with two slots 67 and 67′ arranged along a same diameter of the diaphragm. The ends of protective tube 66 are engaged in slots 67 and 67′. The space remaining within slots 67 and 67′ is filled with solder, at the time of the welding of ring 65 to the periphery of the diaphragm. It is only required that a proper tightness be ensured between the edge of the assembly formed by the ring 65 and the diaphragm, and the half-casings. This can easily be done by welding of these two parts, or by means of flanges not shown in the Figures.

Referring now to FIG. 2, it may be noted that, when the light guide is totally frosted or has its side wall totally frosted, the response of the sensor is the same for two displacements y of same amplitudes, but of opposite signs. It also shows that the sensitivity of the measurements for small displacements (around y=0) is quite poor, which is detrimental in many cases. Moreover, it is not possible to discriminate positive from negative pressure differences. In order eliminate such a drawback, according to the embodiment shown in FIG. 4a, the light guide 70, which is attached to diaphragm 72 and has a circular cross-section, only has half of its side wall frosted. This can for instance be the upper half 74, that is, the one which is not glued to diaphragm 72. The other half of the wall remains unfrosted.

The frosted surface 74 therefore has the shape of a semicylindrical surface when the light guide 70 is at rest or straight.

Figure 4A:
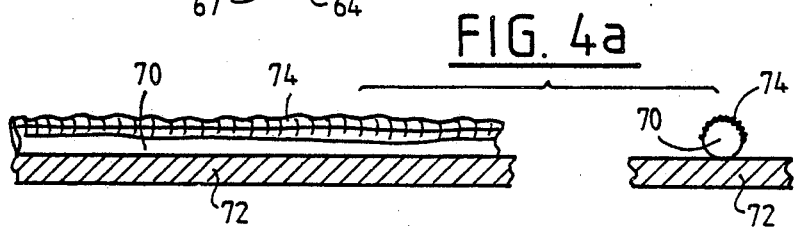
FIG. 4a is a partial view of an optical sensor according to the invention wherein only part of the light-guide wall is frosted.
Figure 4B:
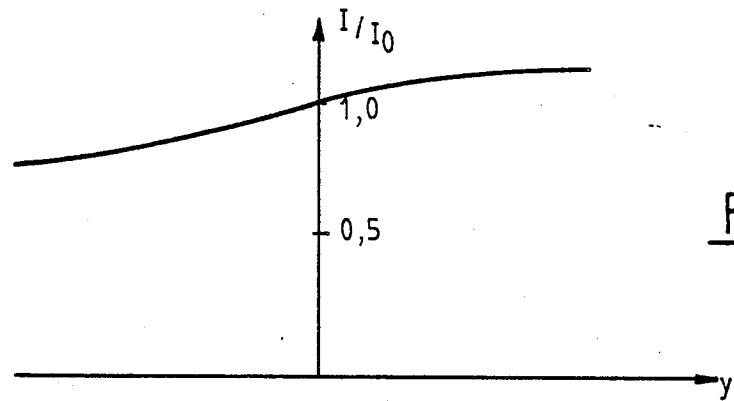

In that case, it should be understood that the graph of FIG. 4b which shows the ratio of light intensity at the output of the light guide (I) to light intensity received when the light guide is straight Io (y=0) as a function of the camber (y) of the light guide, is no longer symmetrical in relation to the rest position corresponding to equal pressures (y=0). The graph has the form shown in FIG. 4B in the case where the light source is of a Lambertain type.

Figure 4C:
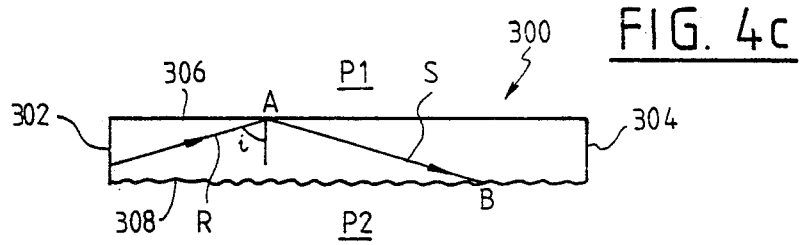
Figure 4D:
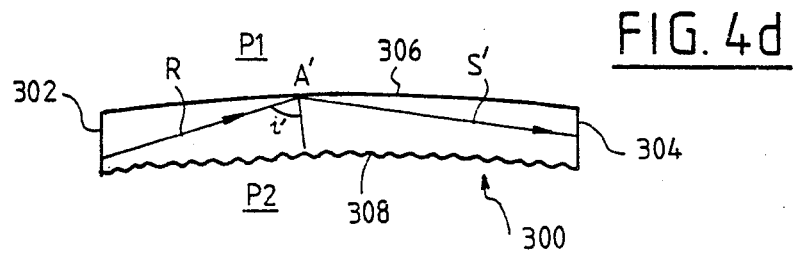

Referring to the drawings of FIGS. 4c and 4d, it will be better understood why the received light intensity I increases for positive values of camber y (P2>P1). In FIG. 4c, is schematically shown a fiber-shaped optical guide 300 having two polished end faces 302 and 304, a half-cylindrical wall 306 which is also polished, and a second half-cylindrical wall 308 which is frosted.

In FIG. 4c a light ray R is shown, which impinges upon the reflecting wall 206 at point A, with an angle of incidence i, such that the reflected ray S impinges upon the frosted wall 308 at point B.

FIG. 4d shows the same guide 300 but with a positive camber due to the pressure P2 being greater than pressure P1. Considering the same light ray R, it impinges on the reflecting wall 306 at a point A' different from point A, due to the bending assumed by the light guide, point A' being closer to the output face 304 than point A. For the same reason, the angle of incidence i' is greater than angle i. As a consequence, the corresponding reflected ray S' directly exits from the output face 304 without undergoing any reflection. In addition, since the bending of frosted wall 308 only has little influence on the radiated light energy, the overall result of the bending of the light guide is to increase transmitted light energy relative to the light energy transmitted without bending.

In the foregoing description, the filled light guide is shaped as a fiber of cirular cross-section or of rectangular cross-section. In the latter case, it is required that at least one of the side faces be frosted or absorbing.

According to the invention, the filled light guide can also be formed as a plate made of a transparent material.

Figure 5:
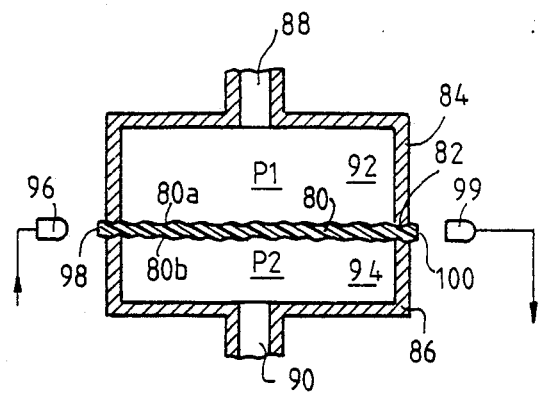
FIG. 5 shows another embodiment of the optical sensor according to the invention wherein the light guide is plane.

FIG. 5 shows a pressure sensor according to the invention wherein the deformable diaphragm 80 consists of a disc made of transparent material with its two faces 80a and 80b frosted. The periphery 82 of disc 80 is tightly engaged between two half-casings 84 and 86 each provided with a fluid inlet nozzle 88 and 90. Diaphragm 80 defines two measurement chambers 92 and 94. A light source 96 is provided facing a portion 98 of the edge of diaphragm 80 and an optoelectrical converter 99 is provided facing a portion 100 of the edge of diaphragm 80, portions 98 and 100 being polished, while the rest of the side edge 98' of the disc absorbs light. It should be noted that according to this embodiment, the disc 80 both functions as the diaphragm which is deformed by the pressure difference, and as the light guide.

Under the influence of pressure differnce, diaphragm 80 assumes a bending which changes the light intensity transmitted by the transparent disc 80. FIG. 6 shows the received intensity I/Io as a function of pressure difference $\Delta p$ ($\Delta p = P2 - P1$) expressed in mbars for a diaphragm/light guide having the following characteristics: it is made of a material sold under the trade mark Plexiglass; it is shaped as a disc with a diameter of 50 mm and a thicknes of 1 mm. In that case, the light souce is of a Lambertian type. The curve is substantially symmetrical and varies the same way as that of FIG. 2 which relates to a fiber-shaped light guide. It should be noted that the similarity of these graphs results from the fact that the frosted plane walls 80a and 80b have a function similar to that of both half-cylindrical frosted walls of the light guide of FIG. 1.

The embodiment of FIG. 5 can only be used if the pressures to be measured are compatible with the mechancial properties of diaphragm made of transparent material.

Figure 7:
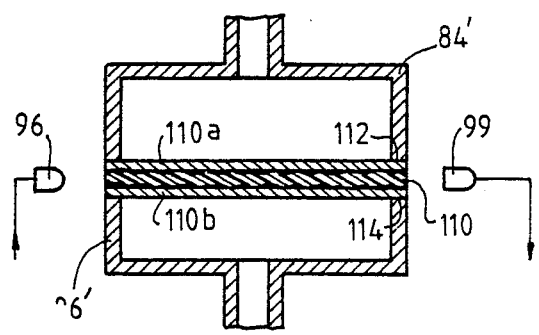
FIG. 7 shows a modification of the optical sensor of FIG. 5.

To extend the useful range of the sensor, FIG. 7 shows another implementation of the invention. According to such an embodiment, the filled light guide has the shape of a disc 110 which is fit between two circular metal diaphragms 112 and 114. These diaphragms are for example made of steel and have a thickness of about 0.3 mm. Moreover, half-casings 84' and 86' are again used to define the measurement chambers. It will thus be noted that the mechanical stress casued by the differential pressure are absorbed by the two metal plates which protect light guide 110. Nevertheless, deformations caused by the pressure difference are totally transmitted to the light guide comprised by the transparent disc 110. According to this embodiment, both walls 110a and 110b are frosted. This results in a response curve substantially similar to the one represented in FIG. 6.

Figure 8:
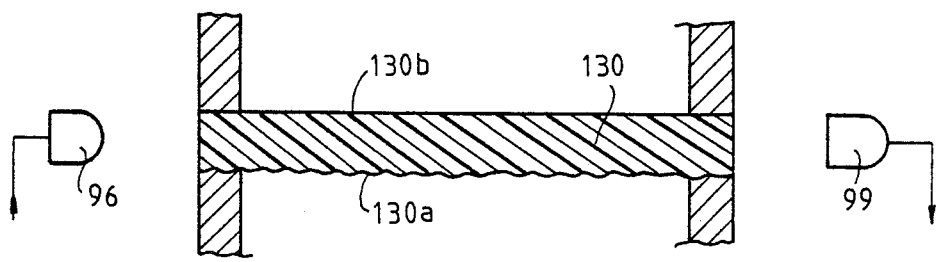
FIG. 8 shows another modification of the optical sensor of FIG. 5, wherein only one wall of the light guide is frosted.

FIG. 8 shows another embodiment of the sensor, which aims at improving the low sensitivity of the sensor for values of the deformation (y) close to zero, and according to which the filled light guide 130, which is a disc made of transparent material, is only frosted on face 130a and polished on the other face 130b.

Figure 9:
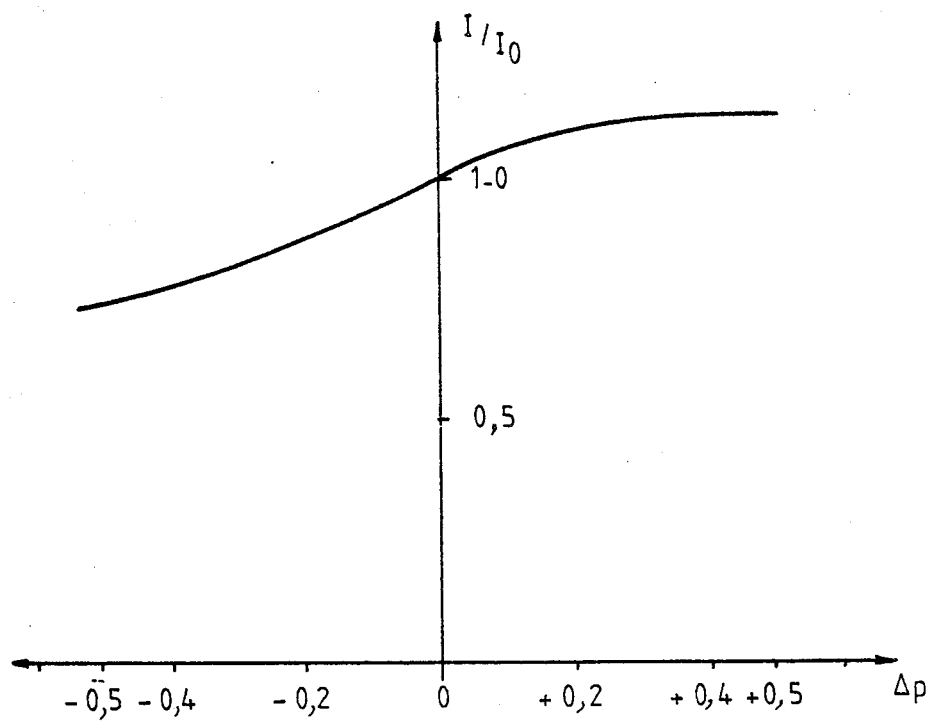
FIG. 9 shows a graph illustrating the operation of the optical sensor according to FIG. 8.

FIG. 9 shows the response curve of such a sensor. The abscissa represent the pressure difference $\Delta p$, while the ordinates are the ratio of light intensity (Io) collected at the output of the light guide when the pressure difference is zero, to the light intensity (I) collected for a pressure difference $\Delta p$. In the example illustrated in FIG. 9, the light source is of the Lambertian type with a radiated wavelength of 0.88 $\mu$m. Disc 130 has a diameter of 50 mm and a thickness of 1.5 mm, and is made of the material sold under the trade mark Plexiglass.

Figure 10A:
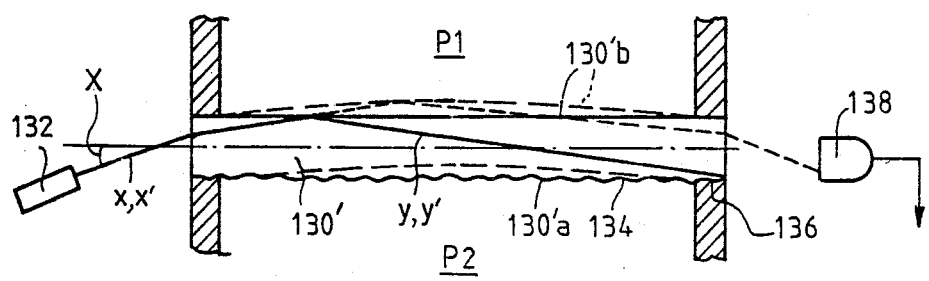
FIG. 10a shows a partial elevational cross-section of an improved embodiment of the sensor of FIG. 8.

FIG. 10a illustrates an improved embodiment of the sensor of FIG. 8, which is improved for substantially increasing the sensor's sensitivity for low values of differential pressure. The light guide 130' is identical to light guide 130 of FIG. 8. In this case, the light source 132 (such as a Helium-Neion laser) radiates a light beam the axis of which is at an angle X close to 4° from the mean plane of diaphragm 130' at rest. At least the part of the disc side wall which is facing the laser should be polished. The light beam has for example a diameter of 0.5 mm. In addition, the frosted wall 130'a of diaphragm 130', is coated with a layer 134 of absorbing material, such as black paint. The axis xx' of the beam radiated by source 132 is directed in such a way that, when the diaphragm is at rest, the axis yy' of the beam reflected by the non frosted wall 130'b of diaphragm 130', impinges on the frosted wall 130'a at the periphery 136 thereof. An optoelectrical converter allows that part of the light beam which is transmitted, to be collected.

Figure 10B:
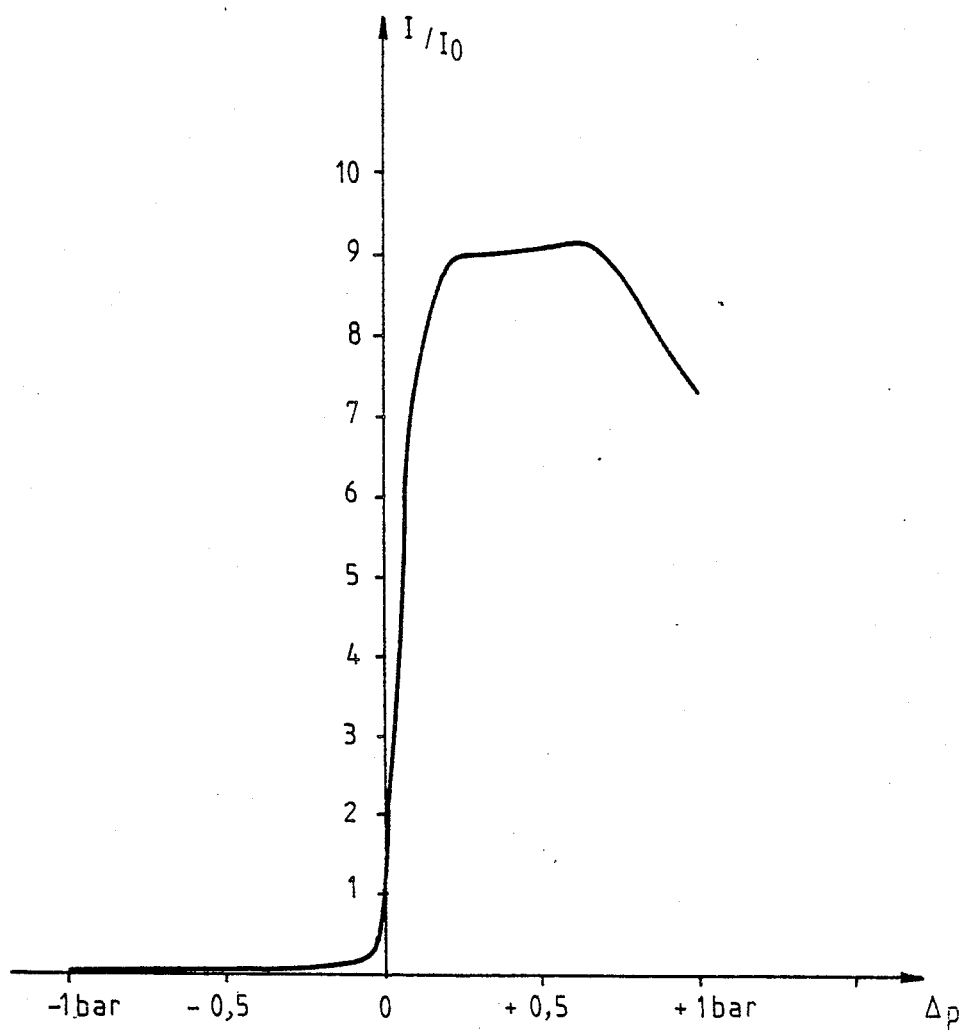

FIG. 10b shows the response curve of the sensor of FIG. 10a described above. In this Figure, the abscissa indicate the pressure difference Δp and the ordinates, the ratio I/Io as previosuly defined. The curve of FIG. 10b shows that a very high sensitivity is obtained for low values of positive (P1<P2) and negative (P1>P2) differential pressures.

In FIG. 10a the non frosted wall 130'b of diaphragm 130 is shown by a dashed line as it undergoes a deformation. It may be noted that in such a case, the axis of the beam reflected by wall 130b (represented as a dashed line) intersects the polished output face 136 of light guide 130'.

Thus, it can be noted that the received light intensity increases very rapidly as a function of camber y of the diaphragm, that is, as a function of the pressure difference Δp. On the contrary, with a negative pressure difference (P2<P1), the axis of the beam reflected by the reflecting wall 130'b is shifted to the left of the Figure, with the result that an even greater part of the beam applied at the input of the light guide is not transmitted.

Such an embodiment of the sensor is particularly appropriate when it is intended to measure the modulation frequency of a differential pressure of low value. Such a sensor is adapted to be used with an eddy flow meter. Obviously, the laser could be replaced by another properly collimated light source.

Moreover, the pressure optical sensor of FIG. 10a can still be improved by placing the transparent disc 130' between two deformable metal diaphragms as has been explained in connection with FIG. 7.

It should be pointed out that in the examples described in connection with FIGS. 1 to 7, the wall(s) of the light guide which is (are) frosted could also be coated with a material that absorbs light. According to still another embodiment, the frosted wall(s) could be replaced by a layer of absorbing material.

The paper "Specular reflectance of optical black coatings in the far Infrared" by S. M. Smith, published in App. Optics Vol 23, 1984 p 2311, describes various materials absorbing light beams, as well as the properties of such materials.

In the implementation examples given above, where only one wall of the light guide is frosted, the sensor's response has a linear region which is restricted to the vicinity of a zero deformation of the light guide.

Figure 11A:
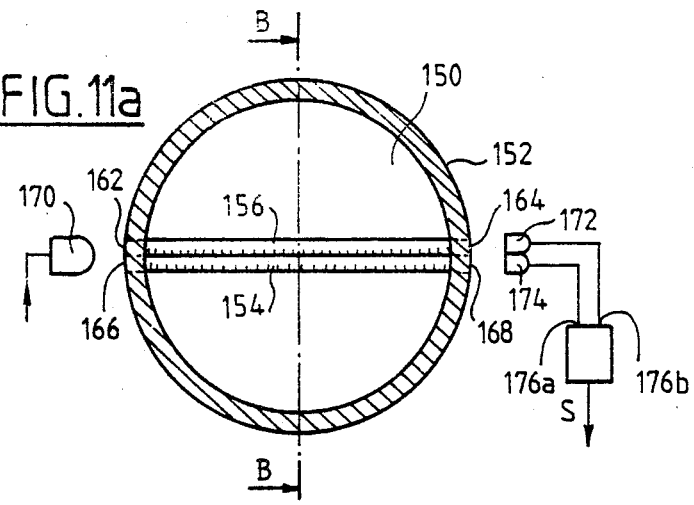
FIGS. 11a and 11b show a top view (FIG. 1a) and a partial cross-section along line B—B of FIG. 11a (FIG. 11b), respectively, of another embodiment of the optical sensor according to the invention, which comprises two fiber light guides.
Figure 11B:
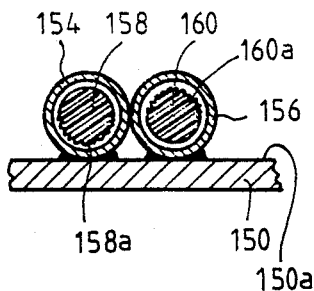

FIGS. 11a and 11b illustrate another embodiment of the invention which allows the linearity range to be increased. This is particularly advantageous when it is desired to measure the value of static differential pressure and not only the modulation frequency of such differential pressure.

According to this embodiment, the sensor comprises a deformable metal diaphragm 150 which seperates the two measurement chambers from each other. In FIG. 11a, the side wall 152 of the upper chamber is the only one respresened. On one face 150a of diaphragm 150, two deformable metal tubes 154 and 156 are fixed, which extend substantially along one diameter of the disc-shaped diaphragm 150. Tubes 154 and 156 are also welded to each other as shown in FIG. 11b. The ends of tubes 154 and 156 pass through wall 152 of the upper measurement chamber in a tight manner.

Preferably, as has been explained in connection with FIG. 3c, each tube 154 and 156 contains a filled light guide shaped as a wire 158 and 160. The filled light guides 158 and 160 extend over the whole length of the tubes. They are made integral with the tubes by means of an appropriate glue. The lower semi-cylindrical wall 158a of guide 158 is frosted, while its upper wall remains polished. On the contrary, the upper semi-cylindrical wall 160a of guide 160 is frosted while its other wall remains polished. Each filled light guide 154, 156 has two ends 162, 164 and 166, 168. Thus, it may be noted that, under the influence of the difference between pressures within both measurement chambers, the bending of diaphragm 1650 is integrally transmitted to light guides 158 and 160, and that when the diaphragm is deformed, one of the frosted wals 158a and 160a is concave, while the other frosted wall 160a, 158a is convex.

The sensor comprises a light source 170 which applies a light beam to the ends 162 and 166 of the light guides and to optoelectrical detectors 172 and 174 which receive the light beam output from ends 164 and 168 of the light guides, respectively. The outputs of detectors 172 and 174 are coupled to the inputs 176a and 176b of a processing circuit 176 which determines the difference between the signals delivered by detectors 172 and 174. Its output 176c produces a measurement signal S.

Figure 11C:
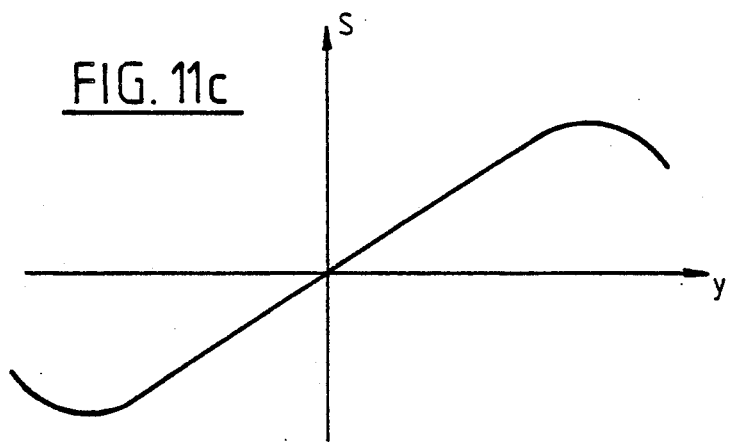
FIG. 11c is a graph showing the operation of the optical pressure sensor according to FIGS. 11a and 11b.

The graph in FIG. 11c gives the shape of signal S as it appears at the output 176, as a function of camber y asumed by diaphragm 150 under the influence of the difference in pressures on both sides thereof. The curve representing the value of signal S as a function of camber y is symmetrical relative to the origin O of the reference axes. It shows that a good linearity is obtained for low values of y below and above zero.

Figure 12:
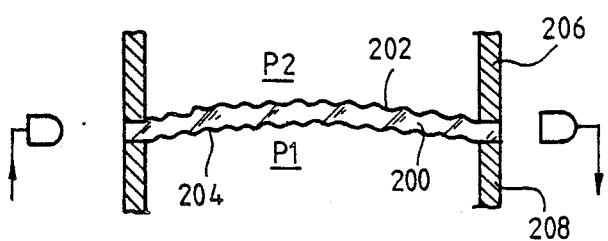
FIG. 12 shows another embodiment of the pressure optical sensor wherein the light guide has been prebent.

FIG. 12 shows still another embodiment of the pressure optical sensor. The filled light guide comprises a disc 200 made of transparent material which is frosted on both of its main walls 202 and 204. Disc 200 is fixed between both half-casings 206 and 208 which define the walls of the measurement chambers in such a way that it already has a very slight bending when pressures P1 and P2 are equal. Such a bending is at most five times greater than the thickness of the light guide in the direction along which pressures are applied. Moreover, the light source 210 and the optoelectrical converter 212 are again used. When the value of P1−P2 increases, the bending of the light guide increases and the light energy received by detector 212 decreases. When pressure P2 is greater than pressure P1 and the difference P2−P1 increases, the bending of light guide 200 decreases and the received light energy increases. The bending can reduce to zero and even assume an opposite sign. In that case, the light energy received by detector 212 goes through a maximum and then decreases.

The response curve of the sensor is as shown in FIG. 6, where the origin of pressure differences Δp is shifted to the left relative to the position O of FIG. 6.

FIG. 13b shows another embodiment of the pressure optical sensor specially configured so that it can be directly fitted into the obstacle of an eddy flow meter.

FIG. 13a shows an eddy flow meter obstacle 220 with trapezoidal cross-section. The obstacle comprises a recess 222 arranged lengthwise and of rectangular cross-section. Both side faces 224 and 226 of obstacle 220, include pressure vents 228 and 230 which open into recess 222.

The pressure sensor 240 comprises two end pieces 242 and 244 coupled together through a thin deformable plate 246 of generally rectangular shape.

In a plane perpendicular to that of plate 246, the end pieces 242 and 244 have dimensions substantially equal to the corresponding dimensions of recess 222 of obstacle 220. When the sensor 240 is installed within recess 222, both ends thereof are blocked by end pieces 242 and 244. Thus, recess 222 is divided by deformable plate 246 into two measurement chambers. Each of pressure vents 228, 230 opens into one of said measurement chambers. As a result, the deformable diaphragm formed by plate 246 is subjected to the difference between the pressures to be measured. It should be pointed out that diaphragm 246 is fixed at both ends 242 and 244 thereof, but that both of its longitudinal edges 250 and 252 are free. There is a small clearance between the edges 250 and 252 of plate 246 and the innter wall of recess 222.

The sensor 240 also comprises a filled light guide 254 which is housed within a protective metal tube 256. The wall of light guide 254 may have one of the aforementioned properties. Preferably, only one of the semicylindrical walls of the guide is frosted and coated with an absorbing black paint layer.

The protective tube 256 is welded to one face of plate 246, parallel to edges 250 and 252, and is placed at equal distances therefrom. The ends 258 and 250 of tube 256 pass through end pieces 242 and 244 by means of openings.

The alternating deflections of plate 246 under the influence of variations in the differential pressure applied thereto, are detected as previosuly explained, for instance in connection with FIG. 1a.

As regards to the various embodiments of the optical sensor, it should be further mentioned that in order to obtain a useful transmission variation, the light guide must satisfy certain geometrical relationships. Let h be the minimum lateral dimension of the light guide and L the light guide's length along the light propagation direction which undergoes a deformation. The following relations must then apply:

$$h/L > \theta_{diff}$$

and $$h/L > \theta$$

where $\theta$ is equal to the smallest of two values $\theta$crit and $\theta$abs. $\theta$ represents the glancing angle at the frosted and/or absorbing guide surface, below which the incident beam is no longer absorbed and/or scattered in an efficient manner. Moreover, it is assumed that h is much smaller than L. $\theta$diff is a value which is related to the dimensions of the light guide and to the wavelength of the light. $\theta$diff can be set equal to $\lambda/h$. Such a limit results from light diffraction phenomena. $\theta$crit is a value which is related to the wavelength ($\lambda$) of the light used and to the rms roughness height of the frosted wall ($\delta$). As a first approximation, $\theta$crit can be set equal to $\lambda/\delta$.

Finally, $\theta$abs is a value related to the absorbing properties of the light-guide wall when the latter, or part of it, is coated with an absorbing material. $\theta$abs depends on the refractive index of the light guide and of the absorbing layer, as well as on the absorption coefficient of said layer.

It should also be mentioned that, since the filled light guide is attached to a support member, whether it is a straight wire or a plate, it is necessary to take special care in order to prevent the support member or the attaching system from modifying the properties of the filled light-guide walls.

In the case of a wire-shaped filled light guide the reflecting wall of which is to be attached to a support member, it may be useful to adopt one of the solutions shown in FIGS. 14a and 14b.

In FIG. 14a the filled light guide consists of an optical fiber 280. The sheath 282 of optical fiber 280 is kept against the semicylindrical wall 284a of the core 284 of the fiber, which must be reflecting. Light guide 280 is attached to diaphragm 286 via sheat 282. The wall 284b of the core is frosted. An equivalent approach is depicted in FIG. 14b. The optical fiber 290 with its core 292 and sheath 294 is halved lengthwise along an axial plane. The exposed core portion 292a is frosted.

When the frosted wall of the filled light guide is to be fixed to a support member, it is preferable to coat the frosted wall with a layer of absorbing material. This prevents the optical refractive index of the material serving as the fixture from modifying the scattering effect produced by the roughness of the frosted wall.

In the case of a plane filled light guide, the non frosted face of which must directly contact the metal support member, it is preferable to machine the support face which faces the light guide so that is has an "optical polish". The reflecting properties of the non frosted wall of the filled light guide are thus preserved.

Figure 15A:
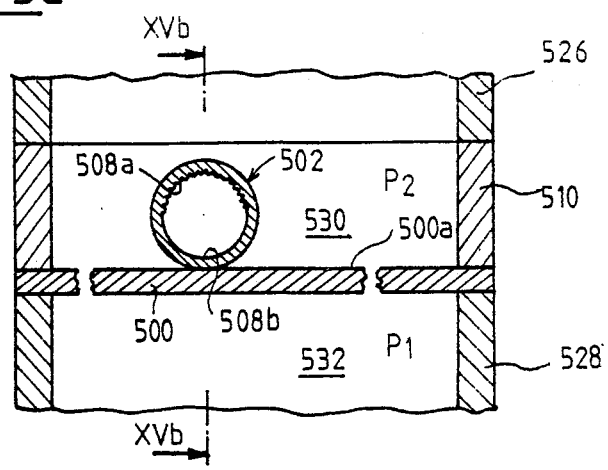
Figure 15B:
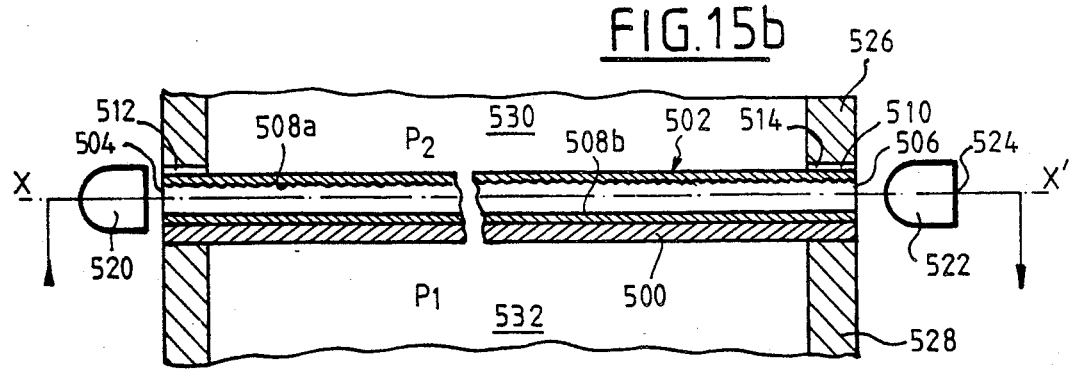

FIGS. 15a and 15b show another embodiment of the differential pressure sensor of the invention, wherein the light guide is a hollow tube (whereas the arrangements of FIGS. 1 to 14 show a filled light guide).

The sensor comprises a deformable diaphragm 500 of circular shape and reduced thickness. It is for example made of steel. On the upper face 500a of diaphragm 500 is welded a light guide, which in the present case consists in a hollow tube 502 whose axis XX' extends along one diameter of diaphragm 500. Both ends 504 and 506 of hollow tube 502 are open. The inner wall 508 of the tube, which is cylindrical in the present example, includes an upper half-cylindrical part 508a which is frosted, that is, provided with some roughness, and a lower half-cylindrical part 508b which is polished, that is, which has good reflecting properties. At the periphery of diaphragm 500 is tightly attached a cylindrical sleeve 510 of slightly grater height than the diameter of tube 502. The sleeve 510 has two diametrical slots 512 and 514 into which the ends of tube 502 are engaged.

Facing the end 504 of tube 502, there is provided a light source 520 which readiates a light beam entering tube 502 through its end 504. In front of end 506 of tube 502 is provided a photodetector which delivers at its output 524 an electrical signal the intensity of which is representative of the light intensity it has received at the output of tube 502. The assembly formed by diaphragm 500, sleeve 510 and tube 502, is fitted between two cylindrical half-casings 526 and 528. The connections between sleeve 510 and half-casing 526 on the one hand, and diaphragm 500 and half-casing 528 on the other hand, are fluid-tight. Both half-casings thus define on each side of diaphragm 500 two chambers 530 and 532 within which pressures P1 and P2 may be established in order to measure their difference.

It may be understood that, when pressures P1 and P2 are equal, diaphragm 500 shows no bending. The same applies to tube 502. On the contrary, if pressures P1 and P2 are different, diaphragm 500, and therefore the axis XX' of tube 505 assume a bending the camber (y) of which depends on the pressure difference and the sign of which depends on where the highest pressure is located (chamber 530 or 532).

Figure 16A:
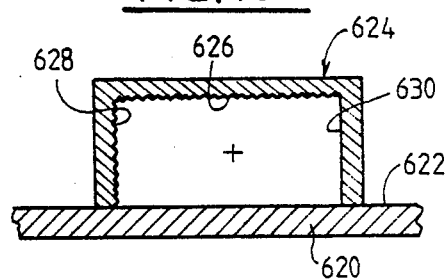
Figure 16B:
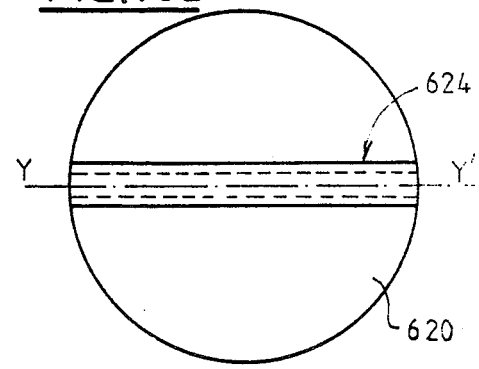

FIGS. 16a and 16b show a modificaton of the hollow tube of FIGS. 15a and 15b. The sensor comprises a deformable diaphragm 620 similar to diaphragm 500 of FIG. 15a, but whose face 622 is polished in order to be optically reflective. On face 622 of diaphragm 620 is fixed an elongate element having a U-shaped cross-section. The longitudinal axis YY' of element 624 extends along one diameter of diaphragm 620. Member 624 and that portion of diaphragm 620 which faces it, form a hollow tube with rectangular cross-section. The inner face 626 of the element opposed to diaphragm 620, as well as the side wall 628 are frosted. However, the side wall 630 remains polished. This results in a hollow optical guide of rectangular cross-section with half of its inner surface frosted and the other half polished, thus reflective.

Such a sensor is quite similar to the sensor of FIGS. 1a and 1b (filled light guide) in its characteristics.

One advantage of the sensors previously described in connection with FIGS. 15 and 16 is that the tube and the diaphragm may advantageously be manufactured from the same material, for example steel. As a result, the temperature changes which the sensor might undergo when in use, will not induce any differential thermal expansion phenomenon which is liable to adversely affect the operation of the sensor.

Besides, it should generally be noted that, whatever the light guide embodiment used, if the sensor is mounted into a device liable to be exposed to substantial vibrations, such vibrations may cause bending deformations of the diaphragm. Such spurious deformations would appear as a spurious modulation of the light signal received by the optical detector.

Figure 17A:
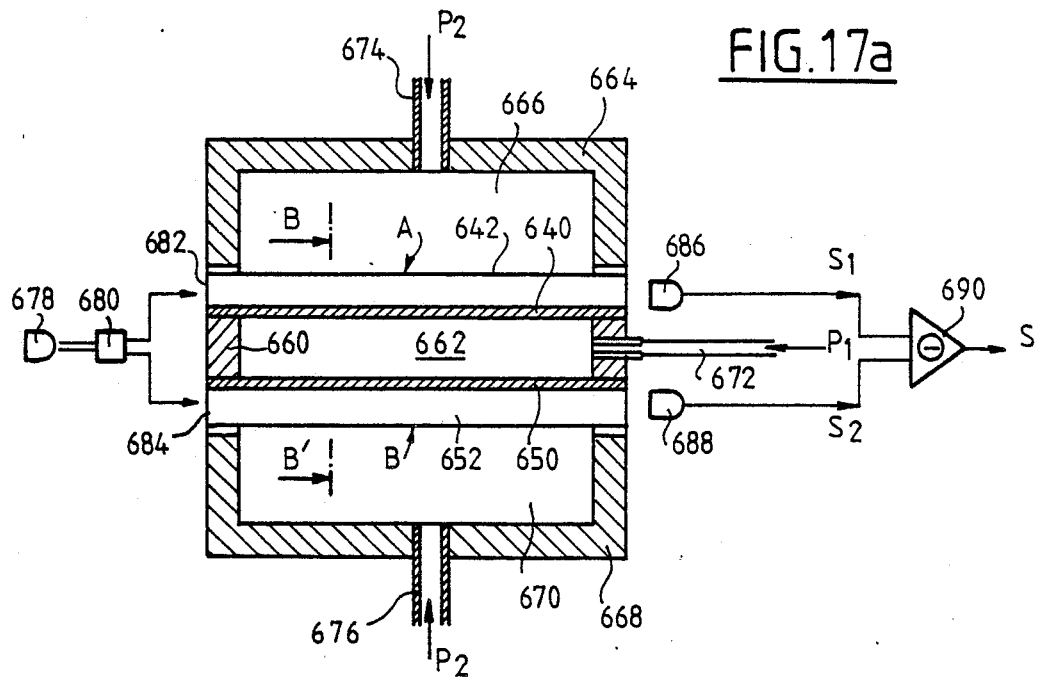
FIGS. 17a and 17b show an embodiment of the invention including two deformable diaphragms, each associated with a hollow tube.
Figure 17B:
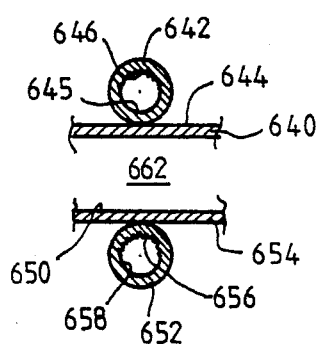

In FIGS. 17 and 18, is shown another embodiment according to the invention which allows one to avoid the problems of spurious mechanical vibrations, and which comprises hollow light guides (FIGS. 17a, 17b) and filled light guides (FIGS. 18a, 18b).

Referring to FIGS. 17a, 17b, the sensor consists of two measurement subsystems A and B. Subsystem A comprises a deformable disc-shaped diaphragm 640 and a light guide, which, in the example of FIGS. 17a and 17b, consists of a hollow tube 642 of circular cross-section fixed to the face 644 of diaphragm 640 along one diameter thereof. As best shown in FIG. 17b, the inner half-wall 645 closest to diaphragm 640 is polished, while the other inner half-wall 646 is frosted. Measurement subsystem B also comprises a deformbalbe diaphragm 650 and a hollow tube 652 of circular cross-section attached to face 654 of diaphragm 650. The inner half-wall 656 closest to diaphragm 650 is frosted and the aother cylindrical half-wall 658 is polished.

The peripheries of faces of diaphragms 640 and 650 which are not provided with tubes, are fixed in gas or fluid tight manner to a cylindrical wall 660, in order to define an intermediate chamber 662. The periphery of the other face of diaphragm 640 is fixed to a first cylindrical half-casing 644 which thus defines a first end chamber 666, and the periphery of the other face of diaphragm 650 is fixed to a second cylindrical half-casing 668, which defines a second end chamber 670. The cylindrical wall 660 is provided with a first nozzle 672 for the feeding of a fluid at pressure P1 into the intermediate chamber 662, and half-casings 664 and 668 are provided with nozzles 674 and 676, respectively, for feeding a fluid at a common pressure P2 into the end chambers 666 and 670.

This system additionally comprises a light source 678 and a beam splitter 680 for applying identical light beams to ends 682 and 684 of tubes 642 and 652. It also comprises two light detectors 686 and 688 which receive the light beams respectively transmitted by tubes 642 and 652 and convert the same into electrical signsals S1 and S2, and a subtractor circuit 690 the inputs of which are coupled to the outputs of light detectors 686 and 688 for delivering a measurement signal S.

As to subsystem B, it is exposed to a pressure difference P2−P1 and behaves like the sensor of FIG. 15a. Signal S1 therefore has a shape as shown in FIG. 4b. Similarly, the measurement subsystem B is exposed to the same pressure difference, with y however replaced by −y and behaves like the sensor in FIG. 15a. As a consequence, signal S2 has a behavior as shown in FIG. 4b when P1−P2 is substituted for P2−P1. If diaphragms 640 and 650 are selected such that they have the same deformation curve versus pressure difference, the representative curves of signals S1 and S2 are symmetrical relative to the axis of intensities. As a result, the signal $S=S1=S2$ has a characteristic curve that crosses origin O and is anti-symmetrical relative to the axis of intensities. It can also be understood that, if the sensor system undergoes a shock or vibrations, signals S1 and S2 are modified in the same manner, in the region close to origin O. As a consequence, signal S is not modified in this region.

FIGS. 18a and 18b show a modification of the example of FIGS. 17a and 17b.

The optical sensor is identical to the one shown in FIGS. 5a and 5b, except for the light conductors. Measurement subsystems A and B comprise diaphrangms 640 and 650 to which are attached the light conductors 700 and 702 each consisting in a filled light guide housed in a protective hollow tube. The light guide 700 comprises a protective tube 704 fixed to the face 644 of diaphragm 640 along one diameter thereof. Inside tube 704 is a filled light guide 706 of circular cross-section, which is integral with tube 702 so that it assumes the same bendings as the latter. The outer half-wall 708 of conductor 706 which is farthest from diaphragm 640 is frosted, while the other half-wall 710 remains polished.

The light conductor 702 comprises a protective tube 712 which is attached to the face 654 of diaphragm 650 along one diameter thereof. Inside tube 712 is a filled light guide 714 of circular cross-section, which is integral with tube 712 so that it undergoes the same deformations as the latter. The outer half-wall 716 of optical conductor 714 which is closest to the diaphragm 650 is frosted, while the other outer half-wall 718 remains polished. The remaing part of the sensor is identical to the one shown in FIGS. 17a and 17b. The same elements are indicated by the same reference numerals as in FIGS. 18a and 18b.

In comparison with the embodiment of FIGS. 17a and 17b, it may be noted that the only function of tubes 704 and 712 is to mechanically protect filled light guides 706 and 714. The latter are made of a transparent material.

Moreover, it may be noticed that there is a functional equivalence between the fact that part of the outer wall of the filled light guide 706 or 714 is frosted, and the fact that the same part of the inner wall of the hollow light guides constituted by tubes 642 and 652 are frosted.

The signal occuring at the output of a subtractor has substantially the same shape as the one shown in FIG. 11c, where y is to be replaced in the abscissa by P2−P1. The measurement thus carried out is substantially independent of vibrations to which the sensor is exposed.

In FIGS. 17a, 17b, 18a and 18b, each light guide is shown as a straight elongate conduit (filled or hollow), provided along one diameter of the corresponding diaphragm.

FIG. 18c shows a modification wherein each light guide 642, 652 is formed of a (disc-shaped) plate made of a transparents material, similarly to the embodiment shown in FIG. 5. Each light guide comprises a wall which is frosted and/or coated with black paint; each guide in itself is a deformable diaphragm. Items of FIG. 18c which are identical or similar to those of FIGS. 18a and 18a b are indicated by the same reference numerals.

The particular embodiments of sensors according to the invention described above, deal with pressure sensors. In the following, there will be disclosed optical sensors according to the invention, which are useful for measuring other physical magnitudes.

FIG. 19 shows a force sensor according to the invention.

It comprises a deformable metal plate 350, the ends 350a and 350b of which are fitted into two fixed elements 352 and 354. To face 350c of plate 350, is fixed a light guide 356 provided in the length direction of plate 350.

The light guide 356 may be of one of the above described types. This may be a filled light guide which either has the shape of a fiber or a plate of transparent material, in which case it is preferred that a second metal plate be provided underneath the light guide. It may also be a hollow light guide shaped as a hollow tube.

If light guide 356 is filled, it may be frosted on one or both of its walls and/or coated with a light absorbing material on one or both of its walls. A light source 358 is provided facing end 350a of light guide 356, while an optoelectrical converter 360 receives the light energy output from the end 350b of the light guide. A movable member 362, the end 362a of which is applied to the center of plate 300, transmits the face which is to be measured.

The movable member 362 provides plate 350 with a bending which is a function of the force F to be measured. It is important that the end 362a of movable member 362 produce a uniform bending of plate 350 without introducing micro-bendings confined to the contact region. The light guide 356 assumes the same bending. As previously explained, the light energy received from detector 360 is a function of the bending of plate 350. As a result, the value of the electrical signal T delivered by detector 360 is a measure of force F.

FIG. 20 shows an accelerometer according to the invention, as seen from above.

It comprises a frame 400 which houses an end 402a of an elongate metal plate 402. The bending of plate 402 is representative of the acceleration applied to the accelerometer, the acceleration being applied perpendicular to the plane of FIG. 20. An optical fiber 404 is fixed on the face 402b of plate 402. Fiber 404 is generally U-shaped. The curved portion 404a is provided close to the free edge 402c of plate 402. The branches 404b and 404c are arranged along the length of plate 402 and their ends are referenced by numberals 406 and 408. A light source 410 is provided facing the end 406 of fiber 402, while an optoelectrical detector 412 is provided facing the end 408 of fiber 402.

Branch 404b has a cross-sectional shape as shown in FIG. 14a. In other terms, the upper part of the optical fiber sheath has been removed and the fiber core wall thus exposed is frosted and preferably coated with a light absorbing material.

Under the effect of acceleration, plate 402 assumes a bending which is representative of the value of acceleration. As previosuly explained, as a result of such bending, the electrical signal U delivered by detector 412 is a measure of acceleration.

Obviously, other sensors according to the invention may be made for measuring other physical magnitudes which cause a bending of the support member, the value of which is representative of the amplitude of the physical magnitude.

We claim:

1. An optical sensor of a physical magnitude comprising:
    a light guide having a first and a second end between which said light guide is substantially straight, said light guide comprising a single uniform medium for conveying light from said first end to said second end, said medium being bounded by a wall extending between both of said ends, at least one portion of said wall having a light absorptivity greater than that of said medium;
    a light source at said first end for applying a light beam to said first end of said light guide;
    means at said second end and optically arranged facing said second end of said light guide for receiving a least a part of the light beam transmitted through said light guide and for generating a signal therefrom;
    deformable support means extending at all points between said first and second ends for supporting said light guide;
    means for applying to substantially the entire support means a bending deformation which is representative of a value of said physical magnitude, the amount of light transmitted through said light guide being affected by contact with said at least one portion of said wall having a light absorptivity greater than that of said single medium as a result of said bending deformation of said light guide; and
    means for processing the received signal in order to derive therefrom a characteristic feature of the deformation of the support means.

2. An optical sensor according to claim 1, characterized in that the light-guide includes a solid transparent material and has an outer wall portion with a light absorbing surface having a light absorptivity greater than that of the remaining part of the light guide, said wall portion surrounding less than the entire circumference of the light guide.

3. An optical sensor according to claim 1, characterized in that the light-guide includes a hollow conductor having an inner wall portion and an outer wall portion, with at least a portion of its inner wall having a light absorbing surface having a light absorptivity greater than that of the remaining portion of said wall.

4. An optical sensor according to claim 1, characterized in that a portion of the light-guide wall is coated with a layer of light absorbing material, said portion surrounding less than the entire circumference of the light guide.

5. An optical sensor according to claim 1, characterized in that a portion of the light guide wall is frosted, said portion surrounding less than the entire circumference of the light quide.

6. An optical sensor according to claim 1, for measuring a pressure difference, characterized in that said support means comprises deformable diaphragm means including and supporting said light guide and said means for applying said bending deformation comprises means for applying on each side of said diaphragm means pressures whose difference is to be measured.

7. An optical sensor according to claim 6, characterized in that said support means lies within a median plane when said pressure difference is zero and in that said light guide has two wall portions substantially parallel to said median plane, at least a part of only one of said two wall potions having a light absorbing surface.

8. An optical sensor according to claim 2, characterized in that said light guide is shaped as a straight wire of circular cross-section and is fixed to one face of said support means along one diameter thereof, and that the outer wall portion which has a light absorbing surface represents one half of said outer wall which is bounded by a plane parallel to a median plane passing through the support means and crosses through the axis of said light guide.

9. An optical sensor according to claim 3, characterized in that said light guide includes a straight hollow tube of circular cross-section and is fixed to one face of said support means along one diameter thereof, and that the inner wall portion which has a light absorbing surface represents one half of said inner wall which is bounded by a plane parallel to a median plane passing through the support means and crosses through the axis of said light guide.

10. An optical sensor according to claim 2, characterized in that said light guide is shaped as a plate which has two elongated faces substantially parallel to each other, and is fixed on one face of said support means, and that said outer wall portion which has said light absorbing surface comprises only one of both faces of said plate.

11. An optical sensor according to claim 8, characterized in that said light source includes means for applying a collimated light beam to one end of said light guide, the axis of said light beam being at an angle relative to a symmetry plane of said light guide parallel to the median plane of said support means and crosses through a portion of the wall portion of the light guide which does not have said light absorbing surface at a point such that an axis of a light beam transmitted through the light guide crosses the wall portion which has said light absorbing surface at a point closer to said second end than said first end of said light guide, when said light guide is not bent.

12. An optical sensor according to claim 8, characterized in that said light guide further comprises a second light guide, substantially similar to the first guide, and fixed to said face of said support means, parallel to said first light guide, said second light guide having a wall portion having a light absorbing surface, which corresponds to a portion of said first light guide which does not have said light absorbing surface, wherein said light source applies a light beam to one end of both said light guides, and the means for optically receiving the light beam comprises two light receivers each collecting the light beam appearing at the second end of one of said light guides, and wherein said processing means comprises means for deriving the difference between the signal delivered by said light receivers.

13. An optical sensor according to claim 8, characterized in that said wire-shaped light guide is surrounded by a deformable protective tube, opened at both ends.

14. An optical sensor according to claim 10, characterized in that said support means comprises two deformable plates and said plate-shaped light guide is disposed between said two deformable plates such that bending deformations applied to said deformable plates are integrally transmitted to said light guide.

15. An optical sensor according to claim 1, characterized in that said support means and said light guide are formed integrally and together comprise a plate of transparent material of general circular shape fixed at its periphery to mounting means.

16. An optical sensor of a physical magnitude comprising:
first and second light guides, each said light guide having a first and a second end between which end said light guide is substantially straight,
each said light guide comprising a single uniform medium for conveying light from said first end to said second end, said medium being bounded by a wall extending between both of said ends, at least one portion of said wall having a light absorptivity greater than that of said medium;
first and second deformable support means extending at all points between said first and second ends for respectively supporting said first and second light guides;
means for applying to a substantial portion of each of said support means a bending deformation which is representative of a value of said physical magnitude;
at least one light source for applying a light beam to said first end of each said light guide;
first and second means optically arranged facing each of said second ends of said light guides for receiving at least one part of the light beam transmitted through said light guides and for generating a signal therefrom, the amount of light transmitted through said light guides being affected by contact with said at least one portion of said wall having a light absorptivity greater than that of said single medium as a result of said bending deformation of said light guides; and
means for processing the received signal in order to derive therefrom a characteristic feature of the deformation of the support means.

17. An optical sensor according to claim 16, characterized in that said support means comprises two deformable disphragms disposed parallel to each other when at rest and two substantially straight light guides, each of said light guides being made integral with a respective diaphragm and arranged along parallel diameters of their associated diaphragms, and wherein the processing means includes means for determining the difference between signals representative of on characteristic feature of the received beams.

18. An optical sensor according to claim 16, characterized in that each light guide includes a solid plate of transparent material, having two elongate faces substantially parallel to each other, wherein said wall portion having a light absorptivity greater than the light guide comprises only one of both faces of said plate.

19. An optical sensor according to claim 17, characterized in that each light guide includes a frosted wall portion arranged along a longitudinal axis of each light guide, said frosted portion of one light guide belonging to the wall portion which is closest to its associated diaphragm and said frosted portion of the other light guide belonging to the wall portion which is farthest from its associated diaphragm.

* * * * *